United States Patent
Chiang et al.

(10) Patent No.: US 6,448,938 B1
(45) Date of Patent: Sep. 10, 2002

(54) METHOD AND APPARATUS FOR FREQUENCY SELECTIVE BEAM FORMING

(75) Inventors: Bing Chiang, Melbourne; Kenneth M. Gainey, Satellite Beach; James A. Proctor, Jr., Indialantic, all of FL (US)

(73) Assignee: Tantivy Communications, Inc., Melbourne, FL (US)

( * ) Notice: Subject to any disclaimer, the term of this patent is extended or adjusted under 35 U.S.C. 154(b) by 0 days.

(21) Appl. No.: 09/879,807

(22) Filed: Jun. 12, 2001

(51) Int. Cl.$^7$ ................................................ H01Q 21/60
(52) U.S. Cl. ........................................ 343/850; 343/853
(58) Field of Search .............................. 343/850, 814, 343/853, 700 MS; 342/372, 368, 432; 455/422

(56) References Cited

U.S. PATENT DOCUMENTS

| | | | | |
|---|---|---|---|---|
| 4,367,474 A | * | 1/1983 | Schaubert et al. | 343/700 MS |
| 5,087,922 A | * | 2/1992 | Tang et al. | 343/814 |
| 5,280,297 A | * | 1/1994 | Profera, Jr. | 343/754 |
| 6,304,215 B1 | * | 10/2001 | Proctor, Jr. et al. | 342/372 |

OTHER PUBLICATIONS

Reynolds, B.C., et al., "Multi–Octave Fixed Phased Center Feed for a Parabolic Reflector or Lens–Type Collimator". Paper prepared for Nineteenth Annual Symposium USAF Antenna Research and Development, Monticello, Illinois, ( Oct. 1969).

FBAR Duplexer for US PCS, Agilent Technologies v.1.03 Sep. 11, 2000.

* cited by examiner

*Primary Examiner*—Don Wong
*Assistant Examiner*—James Clinger
(74) *Attorney, Agent, or Firm*—Hamilton, Brook, Smith & Reynolds, P.C.

(57) ABSTRACT

A phased array antenna provides a subscriber unit with an ability to transmit and receive signals in different directions to allow for optimum gain in both directions, simultaneously. In this way, refraction and multipath effects resulting from communication signals operating at different frequencies can be compensated for to improve gain in both the forward and reverse links. Frequency selective components are coupled to respective antenna elements. At least two weighting structures are coupled to the frequency selective components to produce independently steerable beams having spectrally separated signals. The weighting structures may include phase shifting elements to steer the beams independently and include at least one variable gain amplifying component to independently amplify the signals received by or transmitted by the respective antenna, thereby optimizing the respective shapes of the beams. By having independently steerable and shapable beams, the directive antenna is attractive for use in a multi-band and/or multipath environment, same frequency or spread spectrum network.

28 Claims, 8 Drawing Sheets

METHOD AND APPARATUS FOR FREQUENCY SELECTIVE BEAM FORMING

BACKGROUND OF THE INVENTION

In the area of wireless communications, time division multiple access (TDMA) and code division multiple access (CDMA) protocols are used for communicating from a base station to a mobile station. The TDMA technology uses a single frequency for transmitting and receiving signals, while the CDMA systems use one frequency band for transmitting signals and another frequency band for receiving signals. In both cases, multipath can be a source of interference.

FIG. 1 is an example environment 100 in which multipath is typically present. The environment 100 includes a first antenna tower 105a and a second antenna tower 105b. Each antenna tower 105a, 105b has an associated base station (not shown). The environment 100 further includes a first office building 110a and a second office building 110b. In the first office building 110a, a subscriber unit 115 is within range of signals from both antenna towers 105a, 105b.

There are several signaling paths from the antenna towers 105a, 105b to the subscriber unit 115. A first signaling path 120 is a direct signaling path from the first antenna tower 105a to the subscriber unit 115. A second signaling path 125 includes a reflection off the second office building 110b as the respective signal travels from the first antenna tower 105a to the subscriber unit 115. A third signaling path 130 is a direct signaling path from the second antenna tower 105b to the subscriber unit 115.

The first signaling path 120 is in the direction of the first antenna tower 105a. The subscriber unit 115 does not know where the first antenna tower 105a is located. The subscriber unit 115 can only point (i.e., direct a beam) in the direction of the strongest desired signal, if the subscriber signal is equipped with a steering antenna. The strongest desired signal is in the direction between the locations of the first antenna tower 105a and second office building 110b.

In direction finding (DF), multipath tends to be harmful because it masks the true direction of the signal. The component of the multipath that is in-phase with the first signaling path 120 is actually helpful, and thus, the direction change is inconsequential. So, multipath is not all interference. However, the third signaling path 130 is all interference because it is not the same signal as being transmitted on the first signaling path and can never be in-phase with the signal on the first signaling path.

If the subscriber unit 115 employs a phased array antenna, it can use the phased array antenna to steer an associated antenna beam toward the first antenna tower 105a, or, in the case of multipath as just described, in the direction of the strongest desired signal. Additionally, the phased array antenna may be used to steer the associated antenna beam to receive signals from only the direct signaling path 120 from the first antenna tower 105a to remove the multipath effects (i.e., signal fading) caused by the second signal 125 or interference caused by the third signaling path 130.

FIG. 2 is a block diagram of the phased array antenna used by the subscriber unit 115 of FIG. 1 capable of steering the associated beam, where the steering is done by phase shifting the RF signals to/from the antenna elements composing the array antenna 200. The phased array antenna 200 is composed of antenna sub-assemblies 205. Each antenna sub-assembly 205 includes an antenna element 210, duplexer 215, and phase shifter 220. A control signal 225 is used to adjust the phase shifts imposed by each of the phase shifters 220.

In transmission mode, the sub-assemblies 205 of phased array antenna 200 receive a signal 230. The signal is phase shifted by the phase shifters 220 in a manner where, when the beams of all the antenna elements 210 are combined, the resulting effective beam (not shown) is directed as defined by the control signals 225. The signal 230 passes from the phase shifters 220 to the antenna elements 210 via the duplexers 215, which are in a transmit mode.

In receive mode, the antenna elements 210 receive RF signals most strongly from a direction defined by the same control signals 225. The antenna elements 210 provide the received signals to the duplexers 215, which are set in a receive mode to allow the received RF signal to pass to the phase shifters 220. The phase shifters 220 provide signals 230, which have been phase shifted, to a summer (not shown) to reconstruct the signal. The reconstructed signal is thereafter processed by a receiver (not shown).

SUMMARY OF THE INVENTION

Recently, experiments to determine optimal gain between a subscriber unit and antenna tower have shown that, when using transmission signals of different frequencies, the optimum signaling direction varies for the different frequencies. In CDMA technology, as defined for a subscriber unit, the receive ($R_x$) signals range between 1930-1990 MHz, and the transmission ($T_x$) signals span from 1850-1910 MHz. Further tests were conducted to determine whether the optimum signaling paths differ for the $T_x$ and $R_x$ signals of the CDMA technology, as in the case of transmitting signals having different frequencies. These further experiments proved that, in fact, the optimum signaling paths between a subscriber unit and base station antenna tower are frequency dependent, affecting signaling paths of $T_x$ and $R_x$ signals.

At least one reason for different optimum signaling directions for signals at different frequencies has been determined to be caused by different angles of refraction as the signals travel between the antenna tower and the subscriber unit antenna. For example, in CDMA technology, when the $T_x$ and $R_x$ signals travel through a glass of an office building window, the $T_x$ signals "bend" at a first angle and the $R_x$ signals "bend" at a second angle. The different angles of refraction may also result in the signals taking multiple paths inside an office in which the subscriber unit resides. Further, the $T_x$ and $R_x$ signals bend around objects external from the office building at different angles, which can be another source of difference in transmission paths. The net result of differences in angles and multipath is at best a reduction in signal-to-noise ratio (SNR) and at worst an interference causing disruption in communication.

In directional antenna technology, there is an assumption that the optimum directions of the signals traveling in the forward and reverse links are along the same path. Thus, once a direction has been selected, typically based on $R_x$ signal-to-noise ratio (SNR), the selected direction is used for both $T_x$ and $R_x$ signals. While the selected direction may have been found to be optimal for one of the links, the selected direction of the antenna directivity may be sub-optimal for the other link, as learned during the experiments discussed above.

In general, the present invention provides a subscriber unit with an ability to transmit and receive signals in different directions simultaneously to allow for optimum gain in both directions. In this way, refraction and multipath effects resulting from communication signals operating at different frequencies can be compensated for to improve gain in both the forward and reverse links.

Accordingly, the present invention includes a directive antenna having plural antenna elements arranged in an antenna array. Frequency selective components are coupled to respective antenna elements, where the frequency selective components provide simultaneous frequency discrimination. At least two weighting structures are coupled to the frequency selective components to produce independently steerable beams having spectrally separated signals.

The frequency selective components may be designed to transmit and receive signals in, for example, a CDMA system in which the transmit and receive signaling bands are separated. The frequency selective components may also be designed to separate same direction signals having different frequencies. The frequency selective components may also separate more than two signals, in which case more than two phase-shifting elements are coupled to the frequency selective components. The frequency selective components may be composed of a printed or non-printed technology, or combination thereof.

The weighting structures may include phase shifting elements to steer the beams independently. Independent control signals set-up respective phase shifts. The weighting structures may further include at least one variable gain amplifying component to independently amplify the signals received by or transmitted by the respective antenna elements. By having more than one variable gain amplifying component associated with each antenna element, the respective shapes of the beams can be optimized.

The directive antenna may further include a combiner associated with each beam being produced to combine signals transmitted or received by the antenna elements.

By having independently steerable and shapable beams, the directive antenna is attractive for use in a multi-band and/or multipath environment.

In one embodiment, the subscriber unit optimizes a forward link beam pattern (i.e., a receive, $R_x$, beam to receive signals in the forward link) based on a received pilot signal from a base station. The subscriber unit may also optimize the reverse (i.e., transmit, $T_x$) beam pattern based on a signal quality of a given received signal via a feedback metric from a base station over the forward link. Further, at the same time, the subscriber unit may steer the reverse beam ($T_x$ beam) in the direction of maximum received power of a signal from a given base station, while optimizing the forward beam ($R_x$ beam) on a best signal-to-noise ratio (SNR) or carrier-to-interference (C/I) level. These and other techniques for determining the direction of the beams in both forward and reverse links (i.e., receive and transmit beams, respectively, from the point of view of the subscriber unit) are provided in U.S. patent application Ser. No. 09/776, 396 filed Feb. 2, 2001, entitled "Method and Apparatus for Performing Directional Re-Scan of an Adaptive Antenna," by Proctor et al, the entire teachings of which are incorporated herein by reference.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
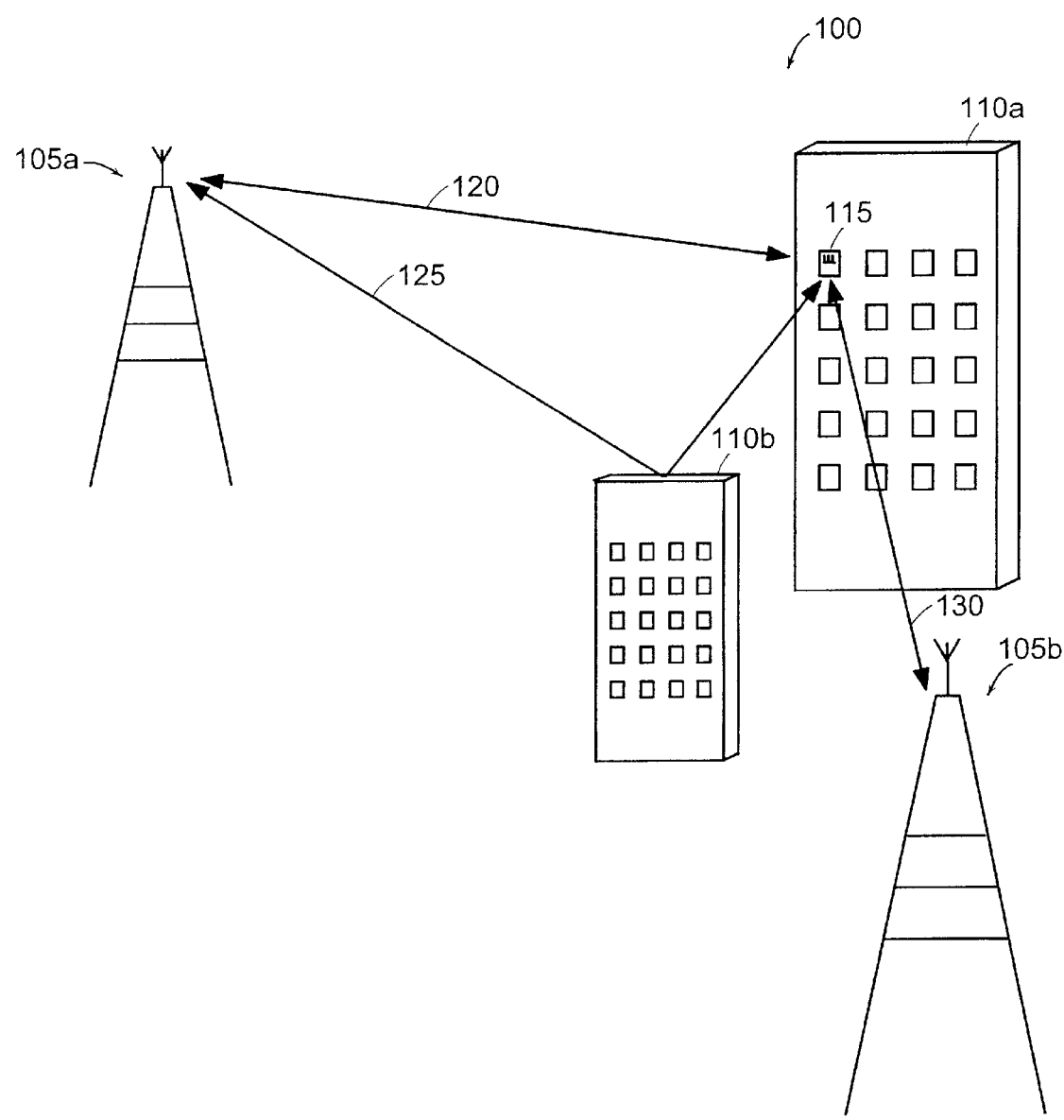
FIG. 1 is a diagram of an environment in which a wireless communication system is deployed.
Figure 2:
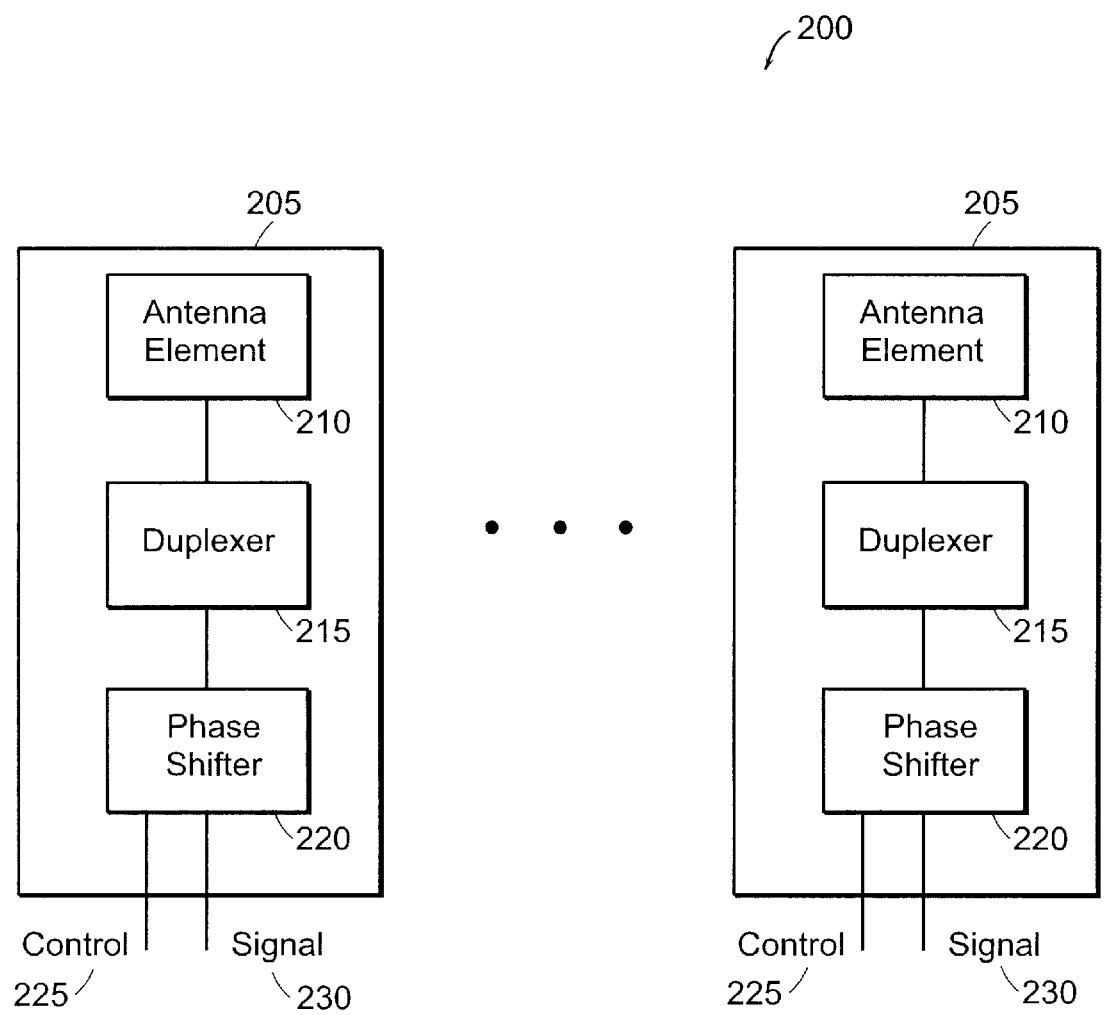
FIG. 2 is a block diagram of a prior art phased array antenna system.
Figure 3:
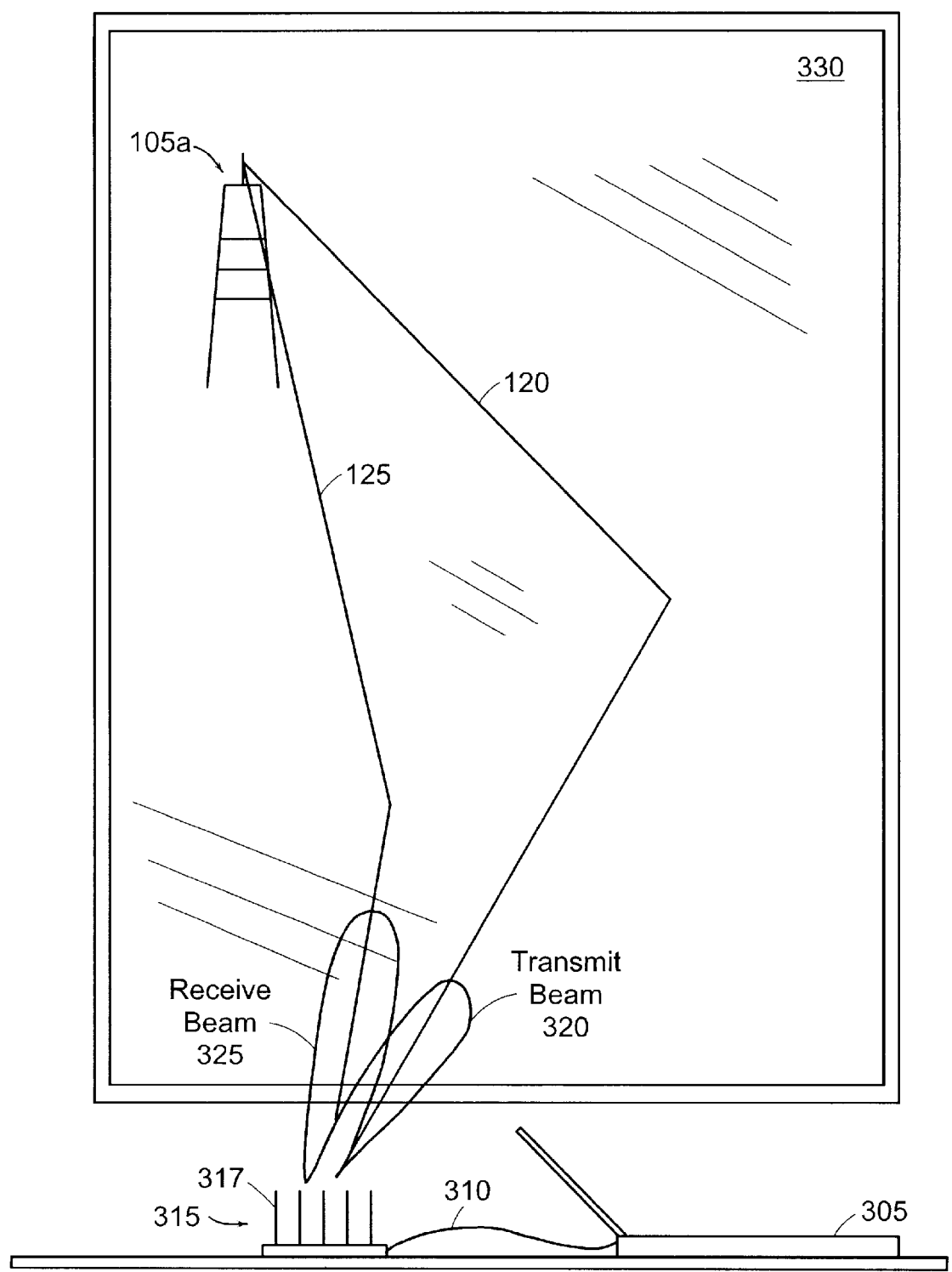
FIG. 3 is a diagram of an environment in which a system employing the principles of the present invention is operating.

FIG. 3 is a diagram illustrating an example usage of the present invention. A portable personal computer 305 is coupled via an antenna cable 310 to an antenna array 315. The antenna array 315 is capable of forming a directive beam due to the spacing of the antenna elements 317.

As shown, the antenna array 315 provides two beams: a transmit beam 320 and a receive beam 325. The transmit beam 320 is directionally pointed to transmit a signal 120 through a window 330 to an antenna tower 105a in an optimal direction. Similarly, the receive beam 325 is directionally pointed to receive a receive beam 125 from the antenna tower 105a through the window 330 in an optimal direction.

In the case of CDMA for a subscriber unit, transmit ($T_x$) signals operate at 1850-1910 MHZ and receive ($R_x$) signals operate between 1930-1990 MHZ. The difference in frequencies between these two signals is enough to cause, for example, a difference in the angle of refraction of the signals transmitting through the window 330, among other directional differences. To optimize the signal-to-noise ratio and mitigate the effects of multipath and other signal interferences, the antenna array is capable of providing the $T_x$ and $R_x$ beams simultaneously, while using the same antenna array 315.

To optimize the receive beam angle, the system controlling the receive beam angle may use the signal-to-noise ratio (SNR) of received signals as a parameter for determining the best angle of the receive beam. A method that may be used to optimize the receiving look angle is described in U.S. Pat. No. 6,100,843 and related pending U.S. patent application Ser. No. 09/616,588, filed Jul. 14, 2000, entitled "Adaptive Antenna for Use in Same Frequency Network," by Proctor et al.; the entire teachings of both are incorporated herein by reference.

To optimize the transmit beam angle, the system controlling the transmit beam angle transmits a signal at different angles and allows the base station (not shown) at the tower 105a to feed back whether the signaling direction is optimal. Various implementations of transmitting and feeding back signals to determine the optimum transmit beam angle can be employed, such as those described in U.S. patent application Ser. No. 09/776,396 filed Feb. 2, 2001, entitled "Method and Apparatus for Performing Directional Re-Scan of an Adaptive Antenna," by Proctor et al., the entire teachings of which are incorporated herein by reference.

For example, as described in U.S. patent application Ser. No. 09/776,396, the subscriber unit may optimize the forward link beam pattern (i.e., $R_x$ beam) based on how well the subscriber unit receives a pilot signal. The subscriber unit may optimize its reverse link beam (i.e., $T_x$ beam) pattern based on a received signal quality of a given signal via a feedback metric from a given base station over the forward link. Further, the subscriber unit may steer the reverse link beam in the direction of maximum received power of a signal from a base station, while optimizing the forward beam (i.e., $R_x$ beam) on a best signal-to-noise ratio (SNR) or carrier-to-interference (C/I) level.

The principles of the present invention are useful in systems in which signals of different frequencies are used. For example, besides a system having transmit and receive beams having different frequencies, the system may be used to transmit two signals at two different frequencies. Further, a receive signal and two spectrally separated transmission signals can be used, where three different beam angles can be provided by the antenna array 315 corresponding to the three signals. The number of simultaneous beam angles requires a corresponding number of phase shifters and frequency selective components providing the same number of frequency channels.

Figure 4:
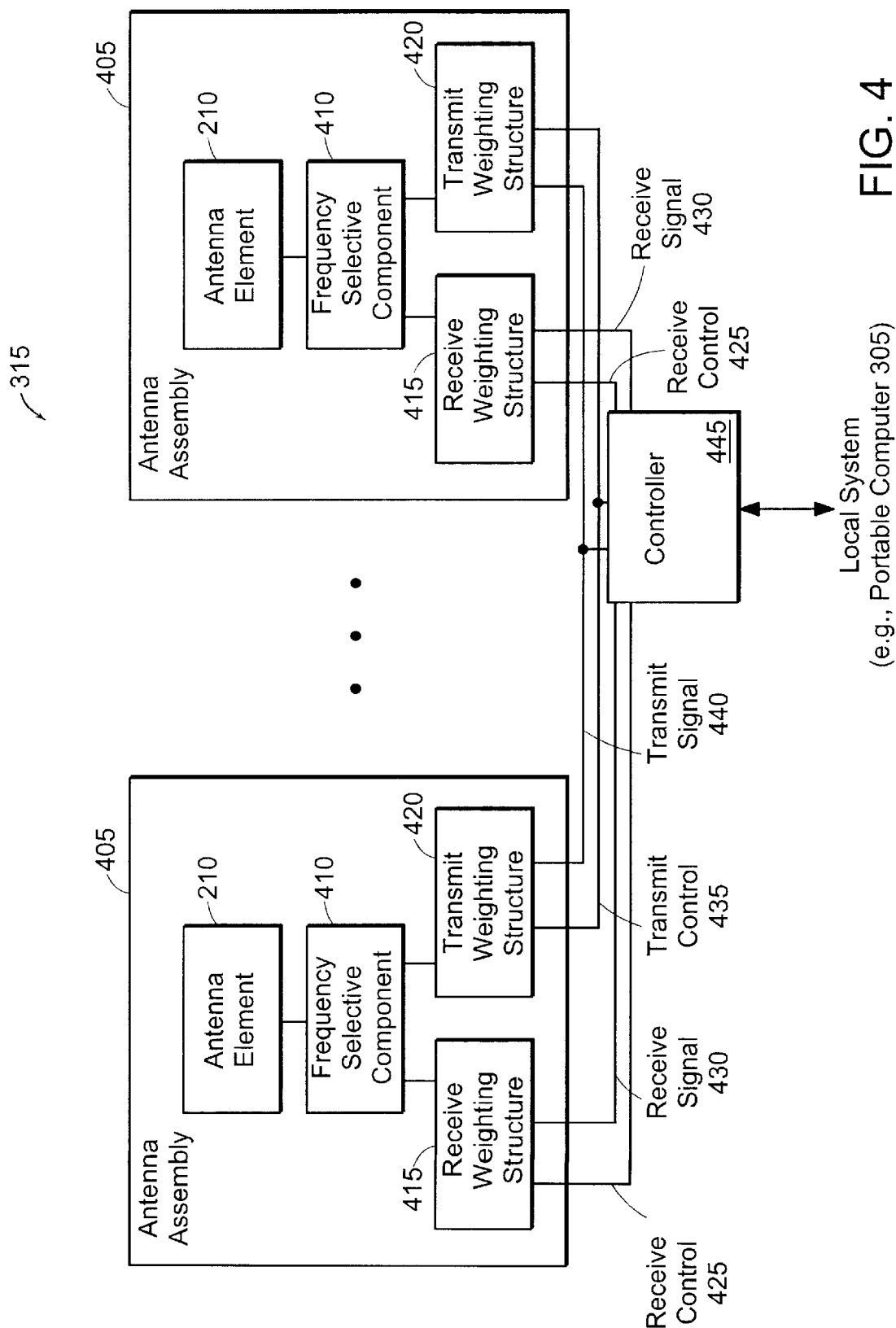
FIG. 4 is a block diagram of a dual independent beam array used by the system of FIG. 3.

FIG. 4 is a block diagram of a system used to provide the transmit beam 320 and receive beam 325. An antenna assembly 405 includes an antenna element 210, frequency selective component 410, receive weighting structure 415 (e.g., phase shifter), and transmit weighting structure 420.

The weighting structures 415, 420 are controlled by respective control signals 20 425, 435. The receive weighting structure 415 supports a receive signal 430, and the transmit weighting structure 420 supports a transmit signal 440.

The antenna assembly 405 is one of n number of antenna assemblies 405 that compose the antenna array 315 (FIG. 3). The number of weighting structures 415, 420 in each antenna assembly 405 determines the number of beams that may be simultaneously generated at different angles and/or patterns by the antenna array 315.

The frequency selective component 410 provides discrimination between signals at different frequencies. Preferably, the frequency selective component 410 provides passive means for splitting the signals at different frequencies, so as to minimize the power required by the antenna assembly 405.

Independent control of the weighting structures 415, 420 is provided by the controller 445, which generates the receive control signals 425 and transmit control signals 435. The controller 445 may include the intelligence to provide the angle and/or pattern for the transmit beam 320 and receive beam 325 (FIG. 3), or, a local system (e.g. portable computer 305) may provide the intelligence for determining the optimum angles and/or patterns of the beams. In such an embodiment, the local system then provides the controller 445 with the optimum angle and/or pattern information, which, in turn is provided to the weighting structures 415, 420.

Figure 5:
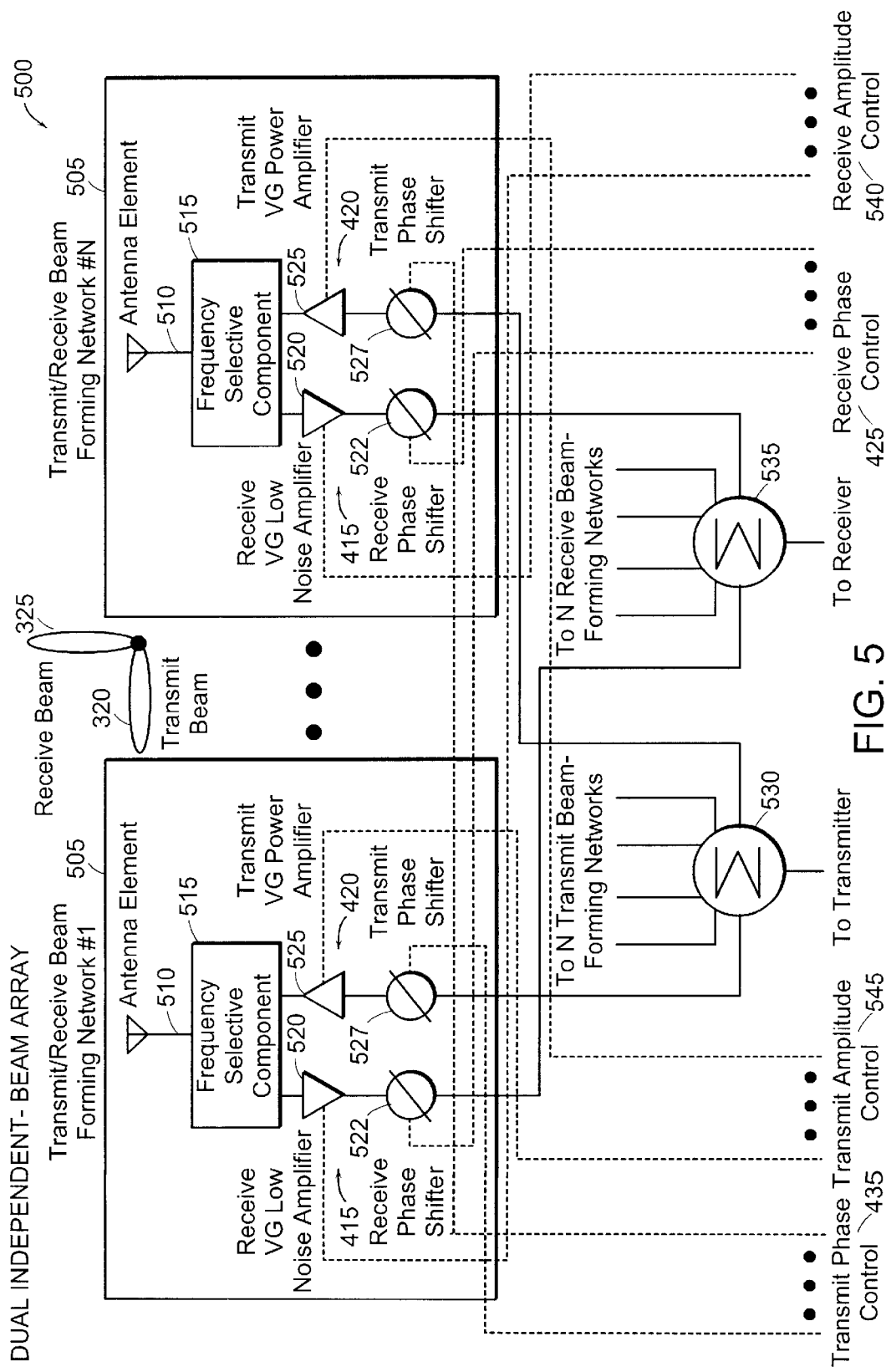
FIG. 5 is a detailed schematic diagram of an embodiment of the dual independent beam array of FIG. 4.

FIG. 5 is a schematic diagram of a more extensive embodiment of the dual independent beam array system of FIG. 4. According to the principles of the present invention, both a transmit beam 320 and receive beam 325 can be independently and simultaneously directed by the same antenna array 315 (FIG. 3).

The dual independent beam array system 500 includes plural transmit/receive beam forming networks 505. Each network 505 includes an antenna element 510, frequency selective component 515, and receive and transmit weighting structures 415, 420, respectively. In this embodiment, the receive weighting structures 415 include a receive variable-gain, low-noise amplifier 520 and a receive phase shifter 522. The transmit weighting structures 420 include a transmit, variable-gain, low-noise amplifier 525.

The amplifiers 520, 525 in the networks 505 provide better performance at possibly higher expense than having single receive and transmit amplifiers located farther from the antenna elements 510. However, since the beams are directive, having higher gain in the peak beam direction, the amplifiers 520, 525 do not necessarily need to be high power, as might be in the case of an omni-directional antenna, so the per- amplifier cost may be relatively inexpensive.

Alternatively, the low noise amplifiers 520 and power amplifiers 525 could be behind the combiner 530 and 535. The system 500 may be less expensive due to a single amplifier implementation, but would likely have worse performance than the distributed amplifier embodiment shown.

The phase shifters 522, 527 can be generic phase shifters or of the type described in U.S. patent application Ser. No. 09/774,534 filed Jan. 31, 2001, entitled "Electronic Phase Shifter With Enhanced Phase Shift Performance" by Chiang et al., the entire teachings of which are incorporated herein by reference.

A first combiner 530 transmits signals to the N transmit portions of the beam forming networks 505. A second combiner 535 receives signals from the N receive portions of the beam forming networks 505. The combiner may be a typical combiner, such as a Wilkinson power combiner.

Further, the antenna elements 510 may be generic antenna elements capable of being used in an antenna array for beam forming other antenna type, such as antennae shown and described in U.S. patent application Ser. No. 09/773,277, filed Jan. 31, 2001, entitled "Stacked Dipole Antenna for Use in Wireless Communications Systems", by Chiang et al. and U.S. patent application Ser. No. 09/773,377, filed Jan. 31, 2001, entitled "Printed Circuit Low Profile Vertical Dipole", by Gothard et al., the entire teachings of both are incorporated herein by reference.

Further, the frequency selective components 515 may be of several types, including printable and/or non-printed types. It is important for the frequency selective components 515, however, to provide sufficient frequency-band isolation so as not to leak $T_x$ and $R_x$ signals onto each other, thereby creating signal noise.

Figure 6:
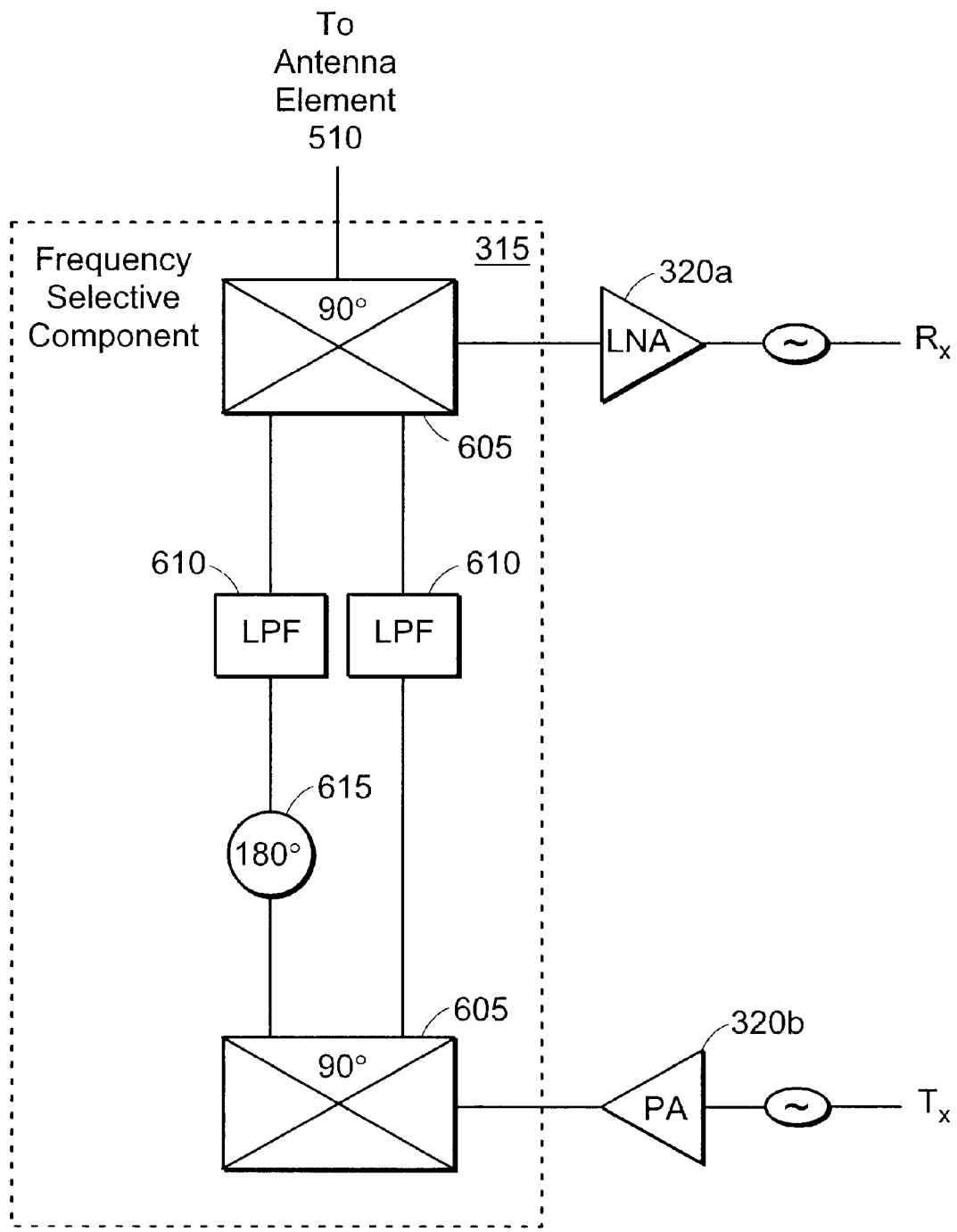
FIG. 6 is a schematic diagram of an embodiment of a frequency selective component used in the dual independent beam array of FIG. 5.

An example of a printed frequency selective component is provided in FIG. 6. Referring to FIG. 6, the frequency selective component 315 includes two 90 degree hybrids 605, two low-pass filters (LPF) 610, and one 180 degree, fixed value, phase shifter 615. The signal received from the antenna element 150 is directed to a first 90 degree hybrid 605 and output to a low noise amplifier (LNA) 320a. The amplified received signal is provided to a receiver (not shown) for further processing.

A transmitter (not shown) provides a signal to the power amplifier (PA) 320b. The amplified transmit signal is processed by the frequency selective component 315 and provided to the antenna element 510 (not shown). The signal being transmitted by the antenna is preferably isolated by the frequency selective component 315 from the low noise amplifier 320a.

The frequency selective component 315 is low in cost, but may not provide the same level of performance as other possible frequency selective components. For example, the frequency selective component 315 does not provide a high degree of isolation between the transmit and receive signals within 80 MHz of each other because of its low Q characteristic. However, because the frequency selective component is printable, it is small and inexpensive to make.

An example of alternative frequency selective component is commercially available from Agilent® Technologies, which is referred to as a thin-film bulk acoustic resonator (FBAR), which provides a high-Q filter in a small package profile. An HPMD-7903, is an example of such an FBAR duplexed and is relatively small. The HPMD-7903 has good performance characteristics, but is more expensive than the printable frequency selective component of FIG. 6.

Yet another alternative embodiment of the frequency selective component 315 is a ceramic duplexer. A ceramic duplexer (i) has a high performance, high-Q filter characteristic, (ii) is relatively cheap, but (iii) is relatively large. Other performance characteristics to consider when selecting a frequency selective component include insertion loss, noise blocking, power handling, transmit and receive bandwidths, isolation between channels, in-band ripple, impedance, and temperature characteristics.

Figure 7:
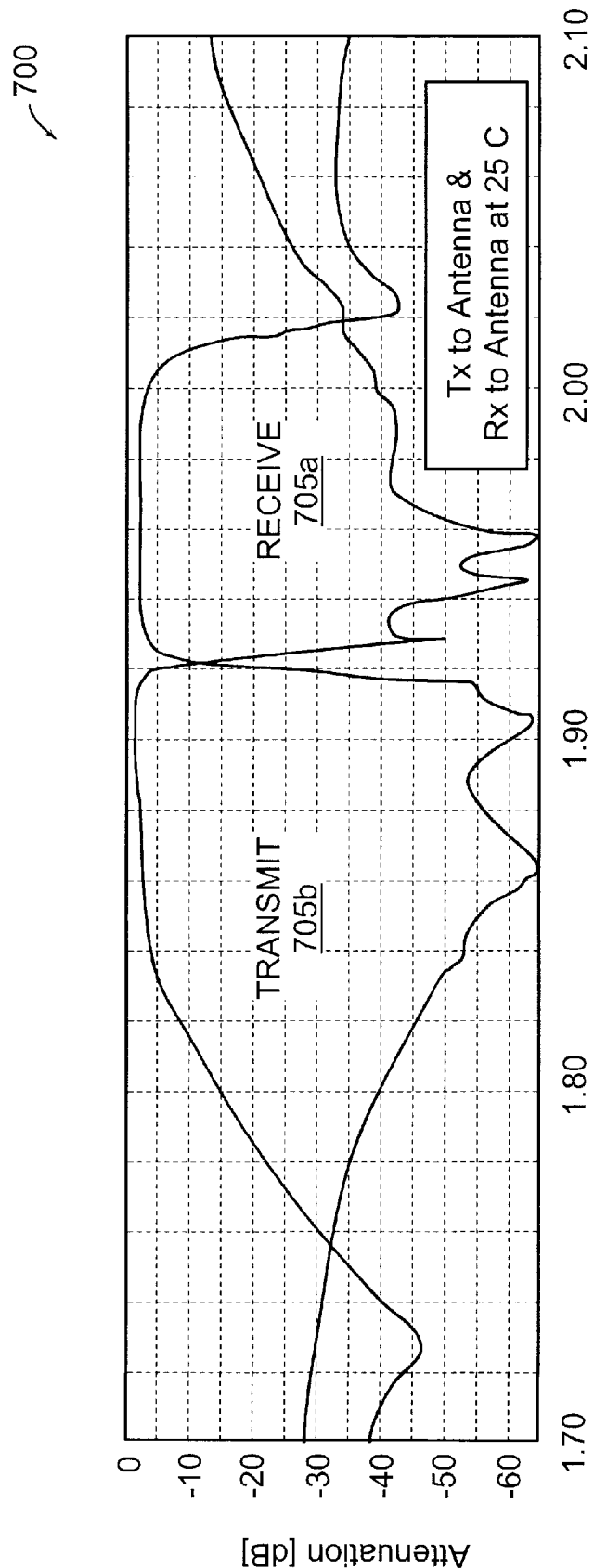
FIG. 7 is a frequency response plot of a typical frequency selective component shown in FIG. 6.

FIG. 7 is an exemplary frequency response plot 700 of a frequency selective component 315. The frequency response plot 700 indicates the pass-band regions of the receive pass band 705a and the transmit pass band 705b. The transmit and receive characteristics are for a subscriber unit in a CDMA system, in which the transmit band is specified between 1850-1910 MHZ and the receive band is specified between 1930-1990 MHZ.

Figure 8:
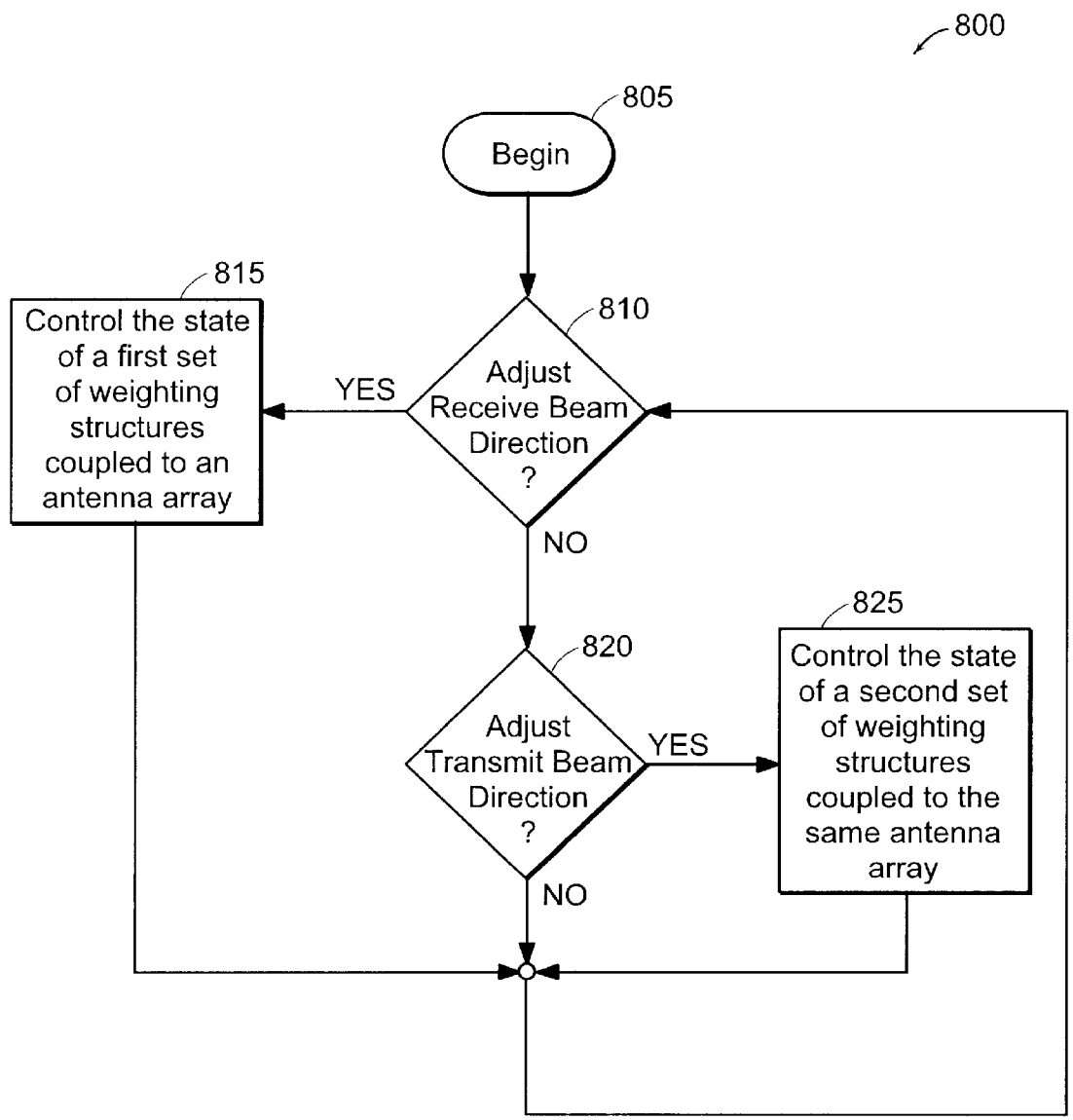
FIG. 8 is a flow diagram of an embodiment of a process employed by the system of FIG. 3.

FIG. 8 is a flow diagram of an embodiment of a process 800 employed by the dual independent beam array system 500 (FIG. 5). The process 800 begins in step 805. In step 810, the process 800 determines whether a control signal has been received to adjust the direction of the antenna array receive beam. If yes, then in step 815, the process 800 controls the state of receive weighting structures 415 (FIG. 5) coupled to an antenna array. If no, then the process 800 continues in step 820.

In step 820, the process 800 determines whether a control signal has been received to adjust the transmit beam direction. If yes, then the process 800 continues in step 825, in which the process 800 controls the state of the transmit weighting structures 420 (FIG. 5) coupled to the same antenna array. The process 800 continues in step 810, unless or until the system is shut off.

Alternative embodiments of the process 800 may include other steps or other decision points to control the antenna array 315 (FIG. 3) (i) in a manner as discussed above, such as controlling the amplifiers 520, 525 (FIG. 5), or (ii) in a manner not described but commonly understood in the art for directive beam control.

The process 800 may be executed by the controller 445 (FIG. 4) or a master controller, such as a controller in the personal computer 305 (FIG. 3).

While this invention has been particularly shown and described with references to preferred embodiments thereof, it will be understood by those skilled in the art that various changes in form and details may be made therein without departing from the scope of the invention encompassed by the appended claims.

What is claimed is:

1. A directive antenna, comprising:
   plural antenna elements arranged in an antenna array;
   frequency selective components each coupled to a respective antenna element; and
   at least two weighting structures coupled to each of the frequency selective components to produce independently steerable beams having spectrally separated signals.

2. The directive antenna as claimed in claim 1, wherein the frequency selective components separate transmit and receive signals.

3. The directive antenna as claimed in claim 1, wherein the frequency selective components separate same direction signals having different frequencies.

4. The directive antenna as claimed in claim 1, wherein the frequency selective components are printed.

5. The directive antenna as claimed in claim 1, wherein the frequency selective components are non-printed.

6. The directive antenna as claimed in claim 1, wherein the weighting structures include phase shifting elements.

7. The directive antenna as claimed in claim 6, wherein the phase shifting elements receive independent control signals to set-up respective phase shifts.

8. The directive antenna as claimed in claim 1, wherein at least one of the weighting structures includes at least one variable gain amplifying component.

9. The directive antenna as claimed in claim 8, wherein the number of variable gain amplifying components associated with each antenna element corresponds to the number of spectrally separated beams being independently optimized in shape.

10. The directive antenna as claimed in claim 1, further including a combiner associated with each beam being produced to combine signals transmitted or received by the antenna elements.

11. The directive antenna as claimed in claim 1, simultaneously producing the beams.

12. The directive antenna as claimed in claim 1, used in a multipath environment.

13. The directive antenna as claimed in claim 1, used in one of the following networks: same frequency network, spread spectrum network, code division multiple access (CDMA) network, or orthogonal frequency division multiplexing (OFDM) network.

14. The directive antenna as claimed in claim 1, wherein one of the weighting structures coupled to the frequency selective components is adjusted to optimize a receive beam pattern based on a received pilot signal.

15. The directive antenna as claimed in claim 1, wherein one of the weighting structures coupled to the frequency selective components is adjusted to optimize a transmit beam pattern based on a received signal quality of a given signal via a feedback metric over a forward link.

16. The directive antenna as claimed in claim 1, wherein one of the weighting structures coupled to the frequency selective components is adjusted to steer a transmit beam in the direction of maximum received power of a signal from a given base station, while another one of the weighting structures coupled to the frequency selective components is adjusted to optimize a receive beam based on a metric selected from the group consisting of a best signal-to-noise ratio (SNR) and carrier-to-interference (C/I) level.

17. A method for producing independently steerable beams, comprising:
   weighting a first signal at a first frequency received by or to be transmitted by plural elements arranged in an antenna array having frequency selective components each coupled to a respective antenna element to produce a first steerable beam; and
   weighting a second signal spectrally separated from the first signal to produce a second and independently steerable beam received by or to be transmitted by the same antenna array.

18. The method as claimed in claim 17, wherein weighting the first and second signals includes phase shifting the signals.

19. The method as claimed in claim 18, further including selecting the phase shift of the first and second signals, respectively.

20. The method as claimed in claim 17, wherein the first signal is transmitted by the antenna array and the second signal is received from the antenna array.

21. The method as claimed in claim 17, wherein weighting the first and second signals includes variably amplifying the signals to optimize the shapes of the beams.

22. The method as claimed in claim 17, wherein weighting of the first and second signals is performed simultaneously to produce the beams simultaneously.

23. The method as claimed in claim 17, used in a multipath environment.

24. The method as claimed in claim 17, used in one of the following networks:
   same frequency network, spread spectrum network, code division multiple access (CDMA) network, or orthogonal frequency division multiplexing (OFDM) network.

25. The method as claimed in claim 17, further including optimizing a receive beam pattern based on a received pilot signal.

26. The method as claimed in claim 17, further including optimizing a transmit beam pattern based on a received signal quality of a given signal via a feedback metric over a forward link.

27. The method as claimed in claim 17, further including steering a transmit beam in the direction of maximum received power of a signal from a given base station, while optimizing a receive beam based on a metric selected from the group consisting of a best signal-to-noise ratio (SNR) and carrier-to-interference (C/I) level.

28. Apparatus for beam forming, comprising:
   means for phase shifting a first signal at a first frequency received by or to be transmitted by plural antenna elements arranged in an antenna array, having frequency selective components each coupled to a respective antenna element, to produce a first steerable beam; and
   means for phase shifting a second signal spectrally separated from the first signal to produce a second and independently steerable beam received by or to be transmitted by the same antenna array.

* * * * *